(12) United States Patent
Hill

(10) Patent No.: US 10,668,513 B2
(45) Date of Patent: Jun. 2, 2020

(54) PIG RECEPTACLE

(71) Applicant: Kyle Hill, Montgomery, TX (US)

(72) Inventor: Kyle Hill, Montgomery, TX (US)

(*) Notice: Subject to any disclaimer, the term of this patent is extended or adjusted under 35 U.S.C. 154(b) by 58 days.

(21) Appl. No.: 16/148,378

(22) Filed: Oct. 1, 2018

(65) Prior Publication Data

US 2020/0101503 A1 Apr. 2, 2020

(51) Int. Cl.
*B08B 9/055* (2006.01)
(52) U.S. Cl.
CPC .................................. *B08B 9/055* (2013.01)
(58) Field of Classification Search
CPC ....................................................... B08B 9/055
USPC ........................................ 15/104.061, 104.062
See application file for complete search history.

(56) References Cited

U.S. PATENT DOCUMENTS

| | | | | |
|---|---|---|---|---|
| 3,879,790 A | * | 4/1975 | Girard | B08B 9/0553 15/104.061 |
| 4,016,620 A | | 4/1977 | Powers | |
| 4,113,050 A | | 9/1978 | Smith | |
| 5,809,603 A | | 9/1998 | White | |
| 6,176,938 B1 | * | 1/2001 | Palmer | F16L 55/1283 134/22.11 |
| 6,569,255 B2 | * | 5/2003 | Sivacoe | B08B 9/0553 134/22.11 |
| 7,185,678 B1 | | 3/2007 | Stell et al. | |
| 8,033,300 B2 | | 10/2011 | McCarty | |
| 8,316,500 B2 | | 11/2012 | Freeman et al. | |
| 8,650,695 B2 | | 2/2014 | Pruett et al. | |
| 9,797,541 B1 | | 10/2017 | Hill | |
| 2008/0105199 A1 | | 5/2008 | Martin et al. | |
| 2010/0205757 A1 | * | 8/2010 | Munden | B08B 9/055 15/104.061 |
| 2016/0074914 A1 | * | 3/2016 | Ullom | F16L 55/28 15/104.061 |
| 2016/0369930 A1 | * | 12/2016 | Poe | F16L 55/46 |

* cited by examiner

*Primary Examiner* — Weilun Lo
(74) *Attorney, Agent, or Firm* — Boudwin Intellectual Property; Daniel Boudwin

(57) ABSTRACT

A pig receptacle is provided. The pig receptacle provides a first circular member and a second circular member attached to at least one elongated rod. The first circular member and the second circular member are sized so that they can receive a pig therethrough. A mesh cage is wrapped around the first circular member and the second circular member so that debris can be gathered during the pigging process. The mesh cage defines apertures that are sized so that large pieces of debris are held in an interior cavity formed by the mesh cage, while small pieces of debris can pass through. In this way, debris is transported through the pipeline and is not lost due to abnormalities in the flow rate through the pipeline.

7 Claims, 3 Drawing Sheets

PIG RECEPTACLE

BACKGROUND OF THE INVENTION

The present invention relates to a pig receptacle device for a pigging system. More specifically, the present invention relates to a pig receptacle to be inserted into a pigging pipeline for the purpose of receiving a pig therethrough.

Pipeline inspection gauges, or "pigs" are devices that are employed in pipeline inspection gauging or pigging systems for the purpose of performing various maintenance functions in pipelines, including but not limited to cleaning and inspecting pipelines. These functions are accomplished by inserting the pig into a pig launcher or launching station, which is an oversized section in a pipeline that reduces to the normal diameter. The launching station is then closed and the pressure-driven flow of the product in the pipeline is used to push it along the pipe until it reaches a receiving station, also known as the pig catcher. At the receiving station, there is a bypass line. The bypass line is the part of the pigging system that enables the product to keep flowing through the pipeline without stopping while a pig is being utilized. However, the bypass line may become blocked by the pig once the pig reaches the receiving station. Moreover, the movement of volume of product flowing from a pipeline through the bypass lines may exert a pressure on the pig, which may lodge the pig in the bypass line. Such blocking or lodging reduces production and may require manual removal or dislodgement of the pig. Therefore, there is a need in the art for a device that will prevent the pig from blocking or getting lodged in the bypass line.

SUMMARY OF THE INVENTION

In view of the foregoing disadvantages inherent in the known types of pig receptacles now present in the known art, the present invention provides a pig receptacle wherein the same can be utilized for providing convenience for the user when feeding a pig through a pipeline.

The present system comprises a first circular ring defining an opening therethrough and a second circular ring defining an opening therethrough. At least one elongated rod connects the first circular ring to the second circular ring. A mesh cage is wrapped around each of the first circular ring and the second circular ring, defining an enclosed interior volume. The mesh cage defines a plurality of apertures. Each aperture of the plurality of apertures is dimensioned to retain debris within the enclosed interior volume. Each of the first circular ring and the second circular ring are dimensioned to receive a pig therethrough.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
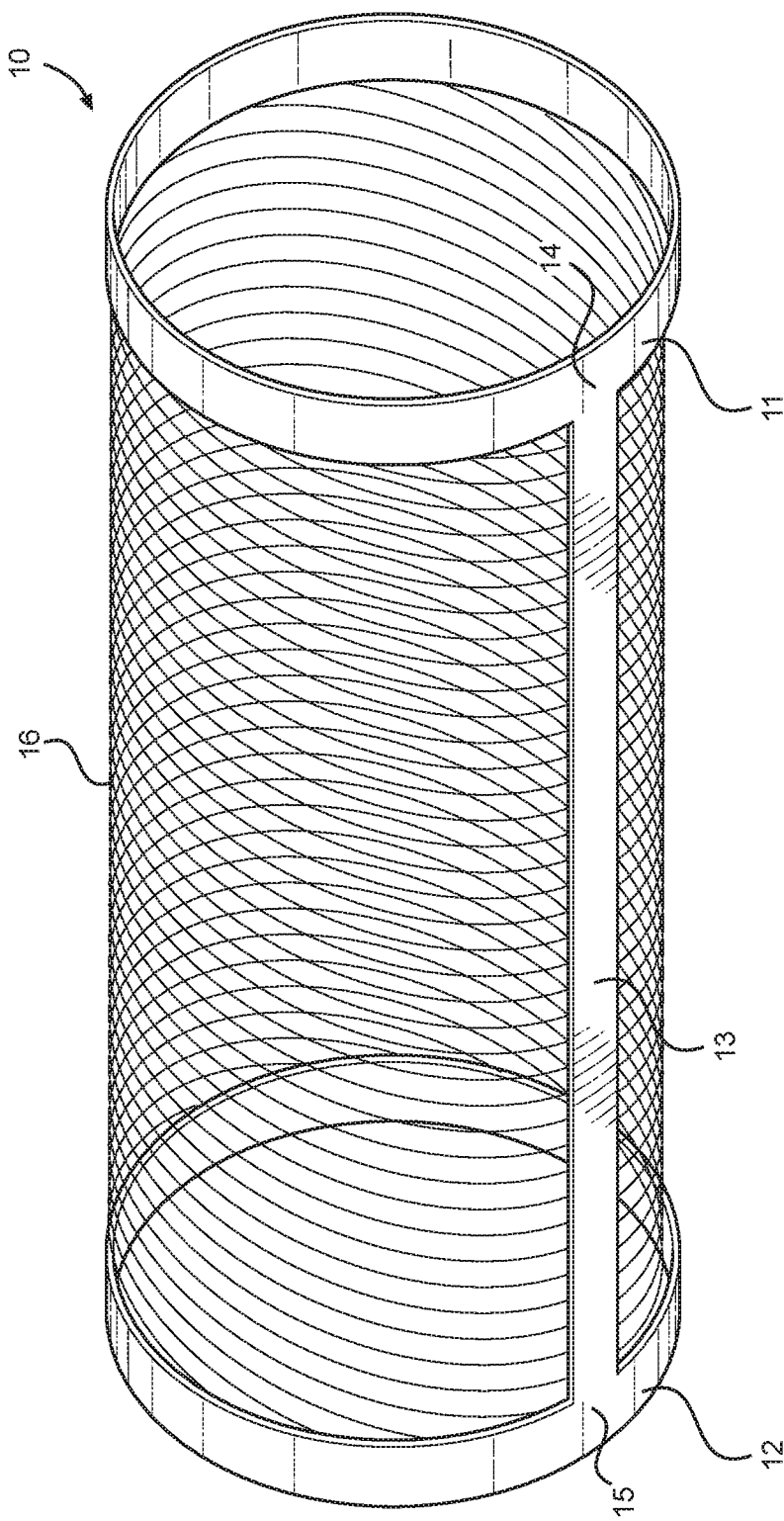
FIG. 1 shows a perspective view of an embodiment of the pig receptacle.

Reference is made herein to the attached drawings. Like reference numerals are used throughout the drawings to depict like or similar elements of the pig receptacle. The figures are intended for representative purposes only and should not be considered to be limiting in any respect.

Referring now to FIG. 1, there is shown a perspective view of an embodiment of the pig receptacle. A pig receptacle 10 comprises a first circular ring 11. The first circular ring defines an opening. The pig receptacle 10 further comprises a second circular ring 12. The second circular ring 12 defines an opening. In the illustrated embodiment, a circumference of the first circular ring 11 is equivalent to a circumference of the second circular ring 12, such that the openings of each thereof are disposed in a parallel configuration. Each of the first circular ring 11 and the second circular ring 12 are dimensioned to receive a pig therethrough. In an alternate embodiment, the first circular ring 11 has a smaller diameter than the second circular ring 12. In a further embodiment, the second circular ring 12 has a smaller diameter than the first circular ring 11.

Furthermore, the pig receptacle comprises at least one elongated rod 13. In the illustrated embodiment, the pig receptacle comprises a singular elongated rod 13. The elongated rod 13 is perpendicularly affixed to an edge of each of the first circular ring 11 and the second circular ring 12. The first circular ring 11 is attached to the elongated rod 13 at a first distal end 14 of the elongated rod 13. The second circular ring 12 is attached to the elongated rod 13 at a second distal end 15 of the elongated rod 13. In the illustrated embodiments, the elongated rod 13 is linear, such that the first circular ring 11 and the second circular ring 12 are held in a symmetrical configuration.

A mesh cage 16 is disposed around both the first circular ring 11 and the second circular ring 12. Because of this disposition, a tube is formed by the mesh cage 16 defining an enclosed interior volume therein. The mesh cage 16 defines a plurality of apertures, wherein each aperture is dimensioned to capture debris in the enclosed interior volume formed by the mesh cage 16. In one embodiment, the mesh cage 16 is disposed on an outside surface of the first circular ring 11 and the second circular ring 12, such that a wider circumference is presented for reception of the pig.

In an alternate embodiment, the mesh cage is disposed on an interior surface of the first circular ring 11 and the second circular ring 12, such that a smoother surface is provided for the pig to pass through. In one embodiment, the mesh cage 16 is ellipsoidal in shape, such that the velocity through which the pig passes through the pig receptacle can be controlled. In the illustrated embodiment, the mesh cage 16 is linearly tubular, such that a pig can pass through the pig receptacle smoothly at a desired velocity. In another embodiment, the mesh cage 16 is attached to the elongated rod 13, such that a uniform attachment surface is provided.

Figure 2:
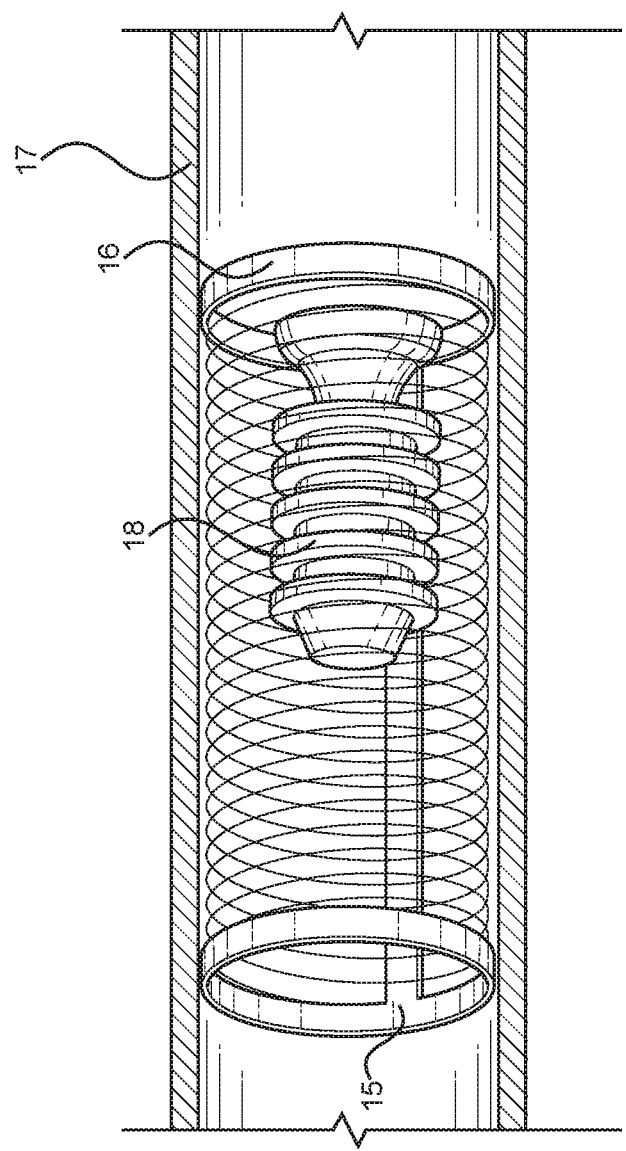
FIG. 2 shows a perspective view of the pig receptacle in use.

Referring now to FIG. 2, there is shown a cross-sectional view of the pig receptacle in use. In one embodiment, the first circular ring 11 and the second circular ring 12 are each dimensioned such that each comprises a diameter sized to fit into a receiving station of a pipeline, such that the pig receptacle can be positioned in a pipeline. In use, the pig receptacle is inserted into a pipeline 17 through a receiving station thereof. As the pig 18 passes through the pipeline during the pigging process, the pig 18 will pass through the pig receptacle, gathering debris as it passes through the pipeline 17. Once the pigging process is complete, the pig receptacle can be removed from the receiving station of the pipeline 17.

Figure 3:
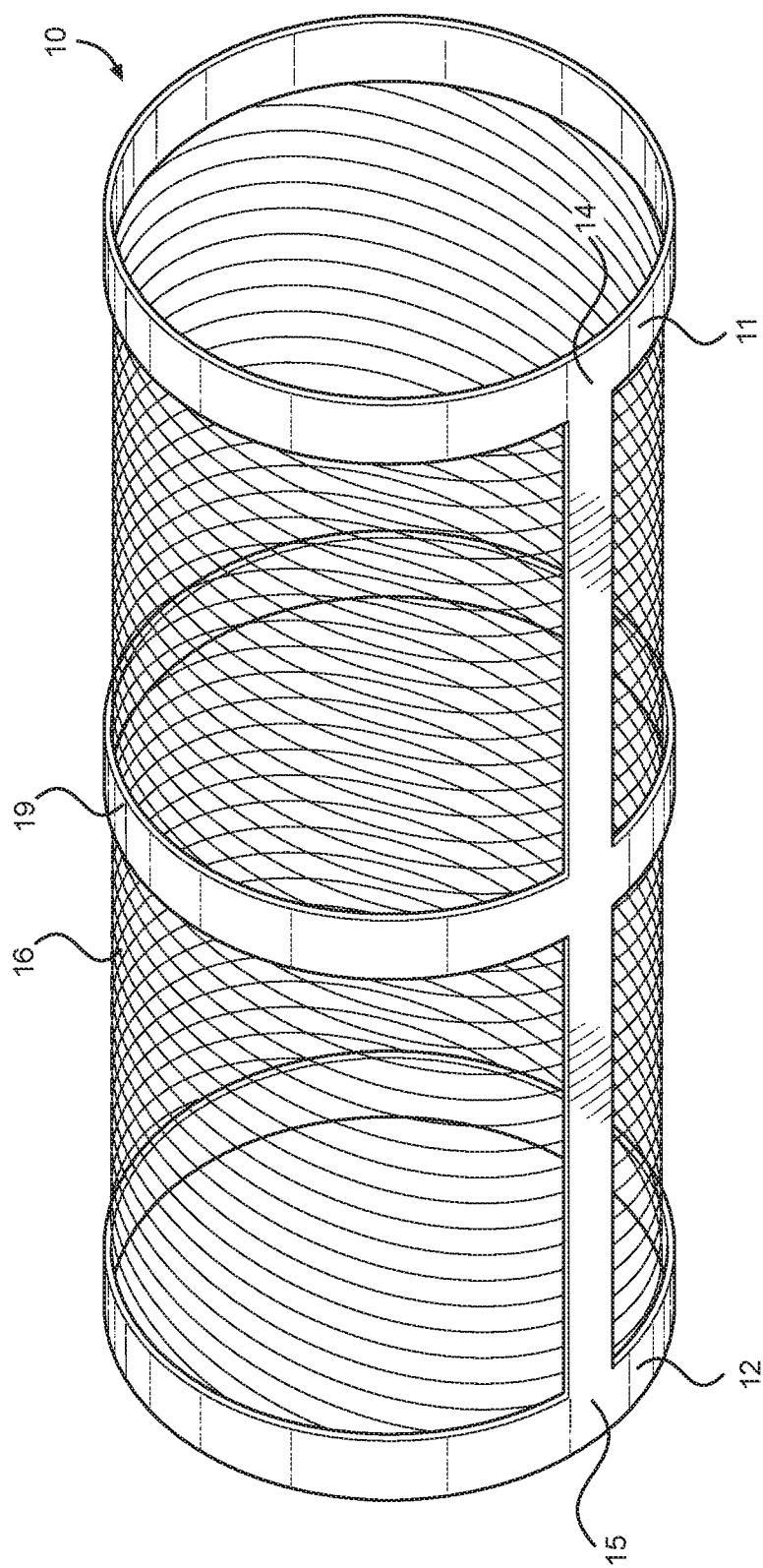
FIG. 3 shows a perspective view of an alternate embodiment of the pig receptacle.

Referring now to FIG. 3, there is shown a perspective view of an alternate embodiment of the pig receptacle. In an alternate embodiment, at least one intermediate ring 19 is disposed between the first circular ring 11 and the second circular ring 12. In the illustrated embodiment, a singular intermediate ring is disposed between the first circular ring 11 and the second circular ring 12. The intermediate ring 19 is disposed at any point on the elongated rod between the first distal end 14 of the elongated rod and the second distal end 15 of the elongated rod, such that support is provided to the mesh cage 16. In the illustrated embodiment, the intermediate ring 19 is disposed at a central point between the first distal end 14 of the elongated rod and the second distal end 15 of the elongated rod, such that centralized support is provided to the mesh cage 16.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pig receptacle, comprising:
   a first circular ring defining an opening therethrough;
   a second circular ring having an opening therethrough;
   at least one elongated rod connecting the first circular ring to the second circular ring, the first circular ring attached to a first distal end of each elongated rod and the second circular ring attached to a second distal end of each elongated rod;
   a mesh cage disposed about each of the first circular ring and the second circular ring, wherein the mesh cage defines an enclosed interior volume;
   wherein the mesh cage comprises a plurality of apertures, wherein each aperture is dimensioned to retain debris within the enclosed interior volume;
   wherein each of the first circular ring and the second circular ring is dimensioned to receive a pig therethrough.

2. The pig receptacle of claim 1, further comprising at least one intermediate circular ring disposed between the first circular ring and the second circular ring.

3. The pig receptacle of claim 1, wherein the mesh cage further covers the second circular ring.

4. The pig receptacle of claim 1, wherein the first circular ring and the second circular ring have a diameter sized to fit into a receiving station of a pipeline.

5. The pig receptacle of claim 1, wherein the mesh cage is ellipsoidal in shape.

6. The pig receptacle of claim 1, wherein the first circular ring and the second circular ring are uniform in circumference.

7. The pig receptacle of claim 1, wherein the mesh cage is attached around the elongated rod and wraps around an exterior portion thereof.

* * * * *